Harold W. Fisher Inventor.
By his Attorney
W. E. Currie

Patented June 30, 1936

2,045,764

UNITED STATES PATENT OFFICE 2,045,764

PYROMETER WELL OR THE LIKE

Harold W. Fisher, Elizabeth, N. J., assignor to Standard-I. G. Company

Application August 18, 1932, Serial No. 629,269

5 Claims. (Cl. 285—46)

This invention relates to improvements in pyrometer wells and similar equipment for high pressure vessels such as equipment for cracking or hydrogenating oil. A particular object of the invention is to provide an improved form of pyrometer well and means for securing it simply and effectively in the equipment. The arrangement of parts is such as substantially to prevent the blowing out of the well by excessive pressure.

Figure 1:
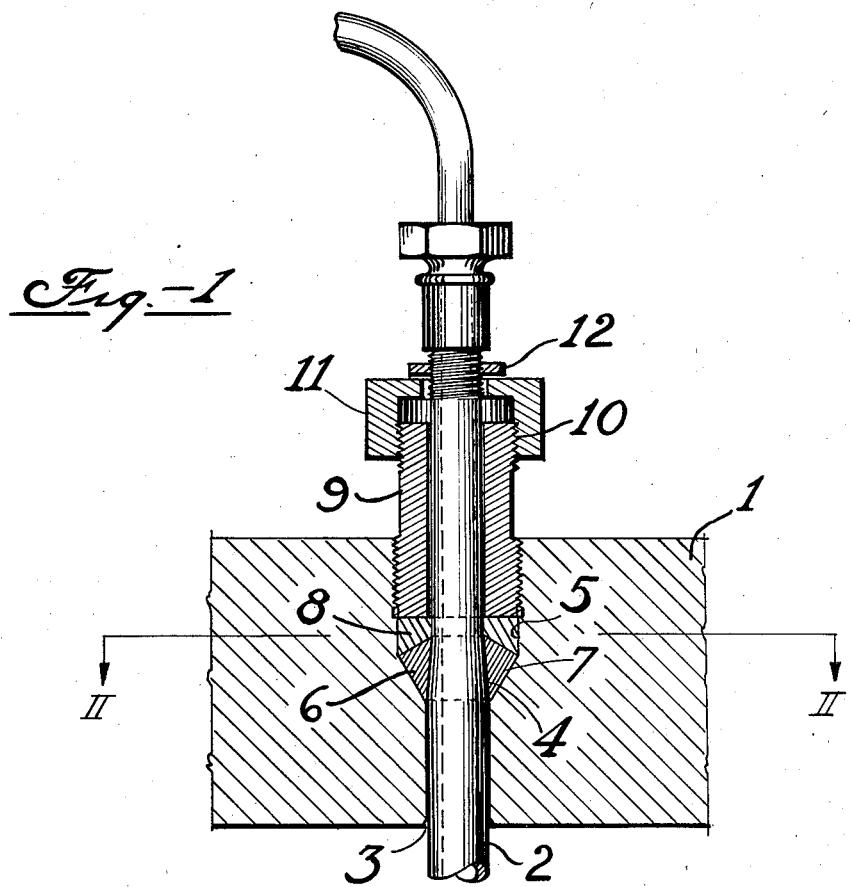
Figure 2:
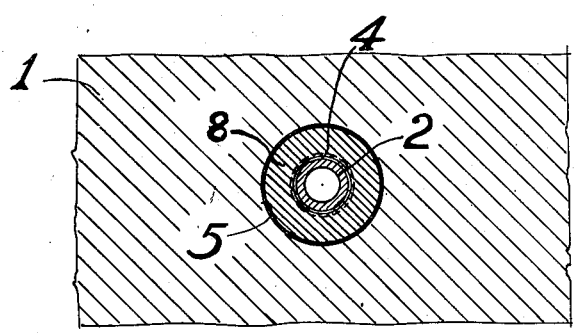

The invention will be fully understood from the following description read in connection with the accompanying drawing, in which Fig. 1 is a vertical section through a preferred form of pyrometer well and means for securing the same in position; and Fig. 2 is a transverse section on line II—II of Fig. 1.

In the drawing reference numeral 1 indicates the wall of the cracking or hydrogenation chamber or other vessel the internal temperature of which is to be determined by a pyrometer, thermometer, or the like. The wall 1 constitutes an outer tubular member. In the form shown a pyrometer well 2 is inserted through an opening 3 in the wall 1. The well has a tapered shoulder 4 so arranged as to lie within an enlargement 5 of the opening 3. The well 2 constitutes an inner member.

A gasket 6 constituting retaining means, surrounds the shoulder 4 and is preferably in the form of a wedge-shaped ring having sloping sides presenting as shown a double cone form in cross section. This gasket is made of relatively soft steel or other pressure resistant material adapted to form a tight joint with the inclined surfaces 7 at the base of opening 5.

An anti-friction washer 8 is of annular form and arranged to encircle the well 2 and rest against the top of gasket 6. The parts referred to are held in assembled position by a screw plug 9 engaged with threads in the top of opening 3. The top of this plug is provided with screw threads 10 for engagement with the pyrometer well closure preferably in the form of a nut 11. After the device has been assembled the nut 11 is so adjusted as to exert a force upward against nut 12 which is threaded on the end of pyrometer well 2 forcing the well into intimate contact with gasket 6. The action of nut 11 is therefore to duplicate at time of assembly the force resulting during use from the internal pressure within the vessel.

It will be noted that the pressure in the equipment tends to force the pyrometer well against the gasket 6 and in so doing tightens the joint between the parts. If desired the interfaces may be made at the same angle or they may be made at slightly different angles so that line contact instead of surface contact is obtained. In either case a tight joint will result from the construction described. Aside from the high resistance to the displacement by pressure the invention has the further advantage of permitting the pyrometer well to be inserted either from the top or the bottom of the wall 1.

It will be understood that the electrical connections and the pyrometer elements are of the conventional type or any suitable type, the invention here being in the means for housing them and securing the housing in position.

Various changes and alternative arrangements may be made within the scope of the appended claims in which it is my intention to claim all novelty inherent in the invention as broadly as the prior art permits.

I claim:

1. A pyrometer well assembly or the like for use on high pressure equipment, comprising a well member having an integrally formed conical shoulder on its outer surface adjacent one end, adapted to be inserted in an opening in the wall of the equipment, a well-encircling member, secured in said opening, adjustable longitudinally of the well member into spaced relation with the shoulder thereon, deformable annular means disposed between said shoulder and the well-encircling member, means adjustably mounted on said well-encircling member, and a stop member on the well operatively associated with the adjustably mounted means whereby when the latter is adjusted the pyrometer well is drawn upwardly to exert pressure jointly against the walls of the opening in the equipment and the lower end of the well-encircling member.

2. Apparatus according to claim 1, in which the well-encircling member is spaced from the shoulder of the pyrometer well by a gasket having in cross section a double conical form and arranged to rest in pressure contact with said shoulder and with the wall of the opening through which the pyrometer well extends.

3. Apparatus according to claim 1, in which the well-encircling member is in the form of a plug screwed into the wall and having its upper end threaded, and the adjustable means is a nut screwed on the said threads at the upper end of the plug.

4. A coupling, comprising an outer tubular member and an inner member telescopically disposed with respect to each other, a portion of the inner wall of the outer tubular member converging inwardly to form an inclined annular shoulder, a portion of the exterior surface of the inner member being tapered inwardly to form an annular shoulder inclined in the opposite direction to the shoulder of the outer member whereby an annular space V shaped in cross section is formed between the shoulders, an annular wedge shaped gasket substantially filling the space between the shoulders, tubular gland means adjustably engaging the outer tubular member and bearing against the gasket to compress the gasket against the shoulders, and means for varying the relative positions of the inner and outer members before compressing the gasket against the shoulders whereby the shoulder of the inner member can be initially positioned in engagement with the gasket.

5. A coupling, comprising an outer tubular member and an inner member telescopically disposed with respect to each other, a portion of the inner wall of the outer member converging inwardly to form an inclined annular shoulder, the portion of the exterior surface of the inner member being tapered inwardly to form an annular shoulder inclined in the opposite direction to the shoulder of the outer member whereby an annular space V shaped in cross section is formed between the shoulders, an annular wedge shaped gasket substantially filling the space between the shoulders, tubular gland means adjustably engaging the outer tubular member and bearing against the gasket to compress the gasket against the shoulders, and means operatively associated with the gland means and the inner member for varying the relative positions of the inner and outer members before compressing the gasket against the shoulders whereby the shoulder of the inner member can be initially positioned in engagement with the gasket.

HAROLD W. FISHER.